Figure 1:
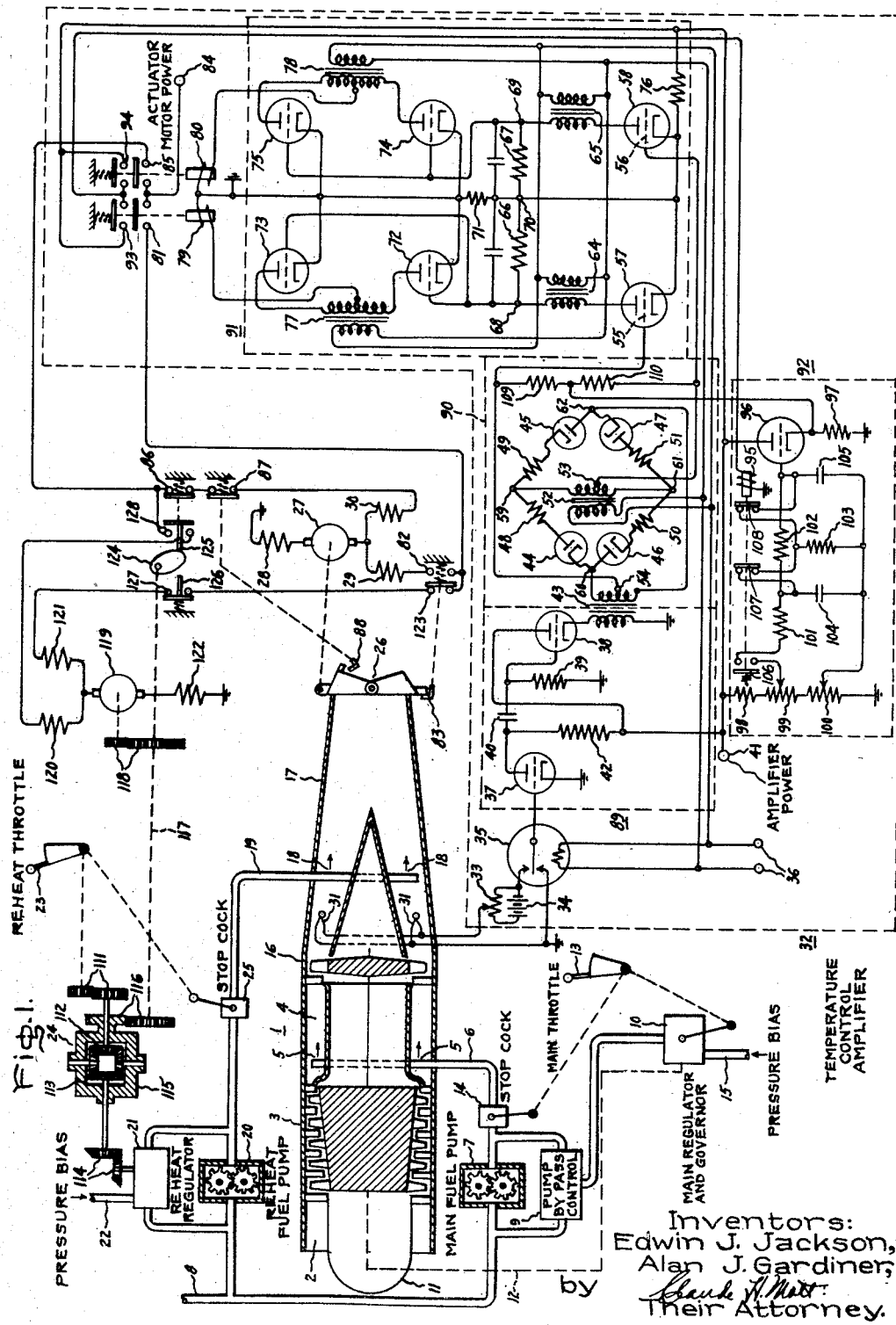

Inventors:
Edwin J. Jackson,
Alan J. Gardiner,
by
Their Attorney.

United States Patent Office 2,699,524
Patented Jan. 11, 1955

2,699,524

STABILIZER CIRCUIT FOR TEMPERATURE RESPONSIVE MOTOR CONTROL SYSTEM

Edwin J. Jackson, Schenectady, and Alan J. Gardiner, Albany, N. Y., assignors to General Electric Company, a corporation of New York Application June 30, 1949, Serial No. 102,226

2 Claims. (Cl. 318—448)

This invention relates to a control system for regulating the turbine discharge temperature of an aircraft gas turbine power plant and, more particularly, to such a control system having an improved stabilizing means. The basic system disclosed and described in this patent application is described and claimed in patent application Serial No. 102,387, filed June 30, 1949, for Gas Turbine Powerplant Having Variable Exhaust Area and Control System Therefor, by John H. Baker, and assigned to the same assignee as the present application. This application is concerned primarily with a system incorporating stabilizing means such as that disclosed below, for instance, in connection with stabilizing network 92.

A gas turbine power plant for the propulsion of aircraft may include an air compressor for initially increasing the pressure of the incoming air, combustion apparatus for burning fuel in the compressed air, and a gas turbine arranged in series flow relation with the compression and the combustion apparatus through which the hot, high pressure gas generated by the compressor and combustion apparatus is expanded. The turbine extracts at least sufficient power from these gases to drive the compressor, and the power remaining may be used to produce thrust for propelling the aircraft by discharging the gases exhausted from the turbine rearwardly through a suitable nozzle. Aircraft gas turbine power plants of this type are more particularly described in Patent 2,432,359 to Dale D. Streid, and in application Serial No. 541,565, filed June 22, 1944, of Alan Howard, both assigned to the assignee of the present application.

In the design of gas turbine power plants, particularly for high performance aircraft, it may be desirable to provide means for augmenting the thrust during short periods of time. Various methods for augmenting thrust have been utilized including water injection and exhaust reheating.

In the exhaust reheating cycle, described in copending application Serial No. 80,696, filed March 10, 1949, in the name of Edward Woll and assigned to the assignee of the present application, additional fuel is injected downstream from the turbine and burned in the tail pipe. The thrust available for propelling the aircraft is a function of the velocity of the hot gases flowing through the nozzle at the rear of the power plant and, thus, the thrust may be augmented by increasing the velocity of the flow of hot gases through the nozzle. This increase in velocity is effected by the additional fuel burning in the tail pipe which increases the temperature of the hot gases after they are discharged from the turbine and prior to the final discharge from the propelling nozzle. This tail pipe burning may yield a nozzle discharge gas temperature which can approach 3,000° F. The resulting high velocity of the gas discharged through the jet nozzle can produce a net thrust increase or augmentation of up to 45% at take off and 90% in high speed flight.

The tail pipe fuel burning does not directly affect the temperature of the gas discharged at the turbine since the burning takes place some distance downstream. However, assuming a fixed area jet nozzle, the increase in discharge gas temperature in the tail pipe by virtue of the tail pipe fuel burning is accompanied by an increase in the static pressure of the gas in the tail pipe proportional to the temperature increase. This increase in discharge gas pressure results in a decrease in the pressure drop across the turbine which tends to decrease the turbine speed. Since most aircraft gas turbines of the type here considered are provided with governors, the decrease in turbine speed will cause the governor to increase the fuel flow to the combustion apparatus so as to return the turbine speed to the desired value. The increase in fuel flow to the main combustion apparatus produces a proportionate increase in the temperature of the gas passing through the turbine so that a turbine discharge gas temperature of 2,000° F. or higher may result by virtue of the tail pipe reheat fuel burning when a fixed area jet nozzle is utilized. This high gas temperature at the turbine may be detrimental to the turbine structure and it is, therefore, desirable to provide means for insuring that the turbine discharge gas temperature does not vary from a constant prodetermined safe level.

It has been found that the turbine discharge temperature can be controlled by varying the area of the jet nozzle. Increasing the area of the jet nozzle reduces the static pressure of the gas in the tail pipe, thus reducing the back pressure on the turbine, which in turn produces a tendency for the turbine to overspeed with a resultant reduction in fuel flow to the combustion apparatus as a result of the action of the governor. Thus, the turbine discharge temperature is maintained at the proper level, but with a new thrust level being produced by virtue of the reheat fuel burning in the tail pipe.

It is, therefore, desirable to vary the area of the jet nozzle in accordance with the turbine discharge temperature to insure that the discharge temperature does not vary appreciably from a predetermined value during tail pipe reheat fuel burning. Furthermore, it may be desirable to modulate the flow of reheat fuel in accordance with the turbine discharge temperature when the maximum area of the jet nozzle has been reached. It may also be desirable to utilize a variable area jet nozzle actuated in accordance with the turbine discharge temperature in gas turbine power plants employing no thrust augmentation system since the turbine discharge temperature may become excessive.

An object of this invention is to provide an improved temperature control system for a power plant.

Another object of this invention is to provide an improved control system for a gas turbine power plant whereby the turbine discharge temperature does not vary substantially from a predetermined constant value.

Another object of this invention is to provide an improved control system for aircraft gas turbines having means for augmenting thrust whereby the jet nozzle area is controlled so that the turbine discharge temperature does not vary from a predetermined constant value during augmentation.

Another object of this invention is to provide an improved control system for aircraft gas turbine power plants having reheat burning of fuel for augmentation of thrust wherein the jet nozzle area is controlled in accordance with turbine discharge temperature and the reheat fuel flow is modulated in accordance with the turbine discharge temperature when the maximum jet nozzle area has been reached.

When such a control as that described above is employed for varying the area of the jet nozzle or modulating the flow of reheat fuel, or both, to maintain a predetermined turbine discharge temperature, whenever there is a change in the system and the control is required to operate, for instance, by the sudden injection of reheat fuel when an extra thrust is called for by the operator, the tail pipe pressure changes, and as described above, the turbine speed will change. As a result of the turbine speed change and the resulting action of the governor, the turbine discharge temperature will change to actuate the control system. Since the control signal is received by the control system only after this sequence of turbine system changes between the equilibrium disturbing factor and the turbine discharge temperature change which initiates the operation of the control system, an appreciable time may elapse between the introduction of the disturbing factor and the operation of the control system. Due to this time lag, the control system, when adjusted to operate as quickly as possible, may overshoot. For instance, when the control system is attempting to reduce the turbine discharge temperature, the nozzle area may be increased too much so that the control is immediately called upon to increase the turbine discharge temperature by reducing the area of the jet nozzle. Again, the control may operate quickly and completely to close the jet nozzle area too much in attempting to increase the turbine discharge temperature so as to again overshoot, increasing the turbine discharge temperature beyond the desired point, thus immediately calling upon the control to again change the jet nozzle area. In this manner, the control system may "oscillate" or "hunt," an extremely undesirable condition which may result in a completely unstable and impractical control system.

It is, therefor, a further object of this invention to provide an improved stabilizing arrangement for a control system such as that described above which will eliminate the unwanted tendency of such a control system to oscillate or hunt.

Another object of this invention is to provide an improved control system for gas turbine power plants whereby the turbine discharge temperature does not vary substantially from a predetermined constant value and including an improved control system stabilizing arrangement which imposes stability upon the system without decreasing the speed of system response.

Further objects and advantages of this invention will become apparent and the invention will be better understood from the following description referring to the accompanying drawings, and the features of novelty which characterize the invention will be pointed out with particularity in the claims annexed to, and forming part of, this specification.

In accordance with one aspect of this invention, an aircraft gas turbine having tail pipe reheat fuel burning for augmentation of thrust is provided with a variable jet nozzle and an actuator mechanism for moving said nozzle. Devices such as thermocouples are positioned in the tail pipe intermediate the turbine and the point of introdutcion of reheat fuel for sensing the turbine discharge temperature. The signal from the thermocouples is compared with a reference temperature signal and the resultant error signal is amplified to energize the variable area jet nozzle actuator. Thus, an increase in turbine discharge temperature produced by reheat fuel burning is accompanied by an increase in jet nozzle area so that the turbine discharge temperature does not vary substantially from a predetermined constant value.

An arrangement is also provided for momentarily de-energizing the variable area jet nozzle actuator immediately after a period of energization in order to prevent overshoot by the control devices and thereby to prevent hunting or oscillation of the actuator. A further aspect of this invention provides for the transfer of the temperature error signal from the variable area jet nozzle actuator to the reheat fuel regulator when the maximum area of the jet nozzle has been reached.

Figure 2:
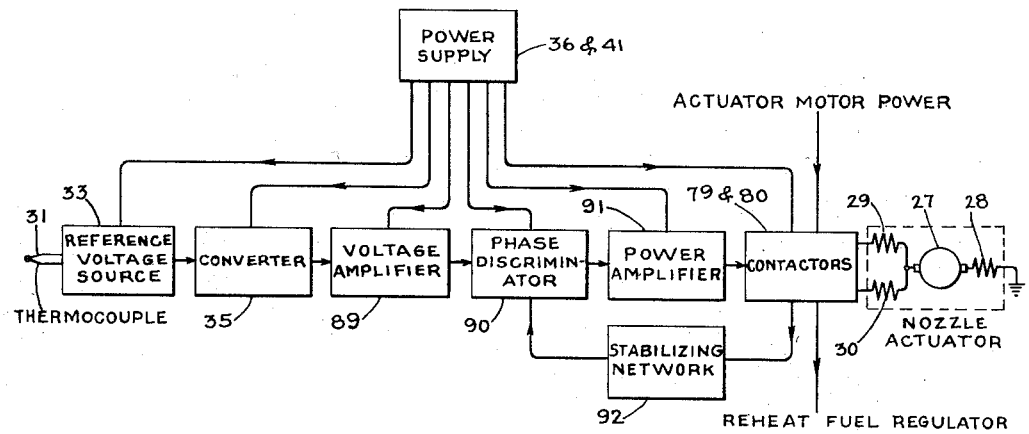
Figure 3:
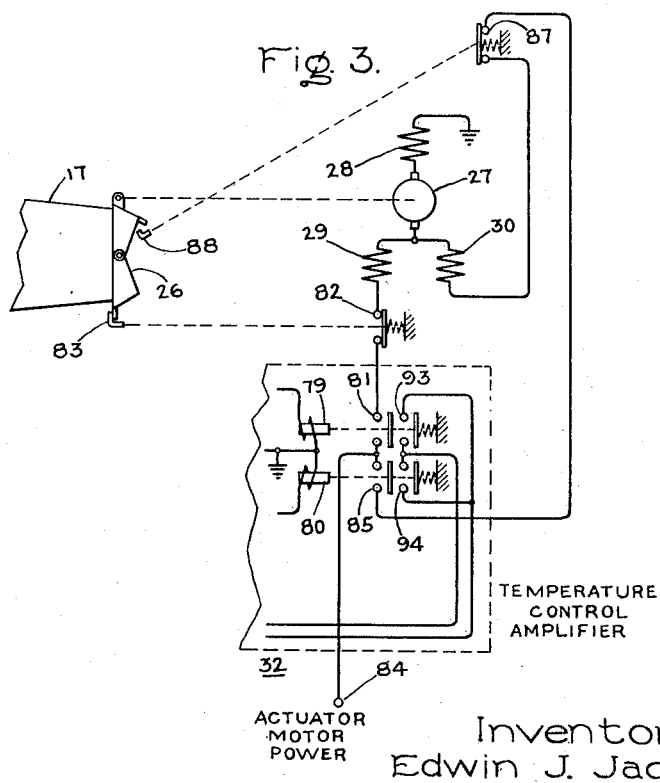

In the drawing, Fig. 1 is a schematic illustration of an aircraft gas turbine provided with the improved control system of this invention; Fig. 2 is a block diagram of the temperature control amplifier which is used to energize the nozzle actuator in accordance with the turbine discharge temperature; and Fig. 3 is a fragmentary schematic illustration of the control of jet nozzle area alone without provision for modulation of the reheat fuel when the maximum limit of the jet nozzle area has been reached.

Referring now to Fig. 1, there is shown an aircraft gas turbine, generally identified as 1. Air is drawn in at an inlet 2 and is compressed by a compressor 3. The main fuel is introduced in combustion chambers 4 by suitable nozzles 5, which are connected in parallel flow relation to a common fuel manifold 6. The fuel is conveyed to the nozzles 5 by a suitable pump 7 from a fuel supply 8. The output of the pump 7 is modulated by a pump by-pass control 9 which is controlled by a regulator and speed governor mechanism 10. The speed governor portion of the regulator 10 is driven from the gear case 11 of the turbine 1 by a shaft shown schematically at 12. The control shaft of the regulator 10 is linked in any suitable manner to a main throttle 13. The main throttle 13 is also linked to a shutoff valve 14 in the manifold 6.

In gas turbine power plants intended for use at sea level or at a substantially constant altitude, it is a relatively simple matter to meet the fuel requirements of the engine. However, in aircraft service, where the engine is required to operate over a wide range of altitude and where the fuel requirements vary as a function of the altitude, it is desirable to provide compensation to limit the output of the fuel pump in accodance with a preselected function of the atmospheric or some other pressure. Thus, the main fuel regulator 10 is provided with pressure compensation from any desired source, as shown at 15.

After the input air has been compressed by the compressor 3 and heated in the combustion chambers 4, it is expanded through the turbine 16 which drives the compressor 3. The hot gases discharged from the turbine 16 are exhausted through the tail pipe 17 and provide the thrust for propelling the aircraft.

In order to provide for reheat augmentation of the thrust, additional fuel is introduced into the tail pipe 17 through suitable nozzles 18 which are connected in parallel flow relation to a common fuel manifold 19. The reheat fuel is conveyed to the tail pipe nozzles 18 by a suitable pump 20 from the common fuel supply source 8 or, alternatively, from a separate supply source. The output of the pump 20 is modulated by a reheat fuel regulator 21, which is also provided with suitable pressure bias, as at 22. The control shaft of the reheat fuel regulator 21 is linked to the reheat throttle 23 through a differential 24, as will be hereinafter described. The reheat throttle 23 is also connected to a stop cock 25 in the fuel manifold 19.

When the reheat fuel from the tail pipe nozzles 18 is burned in the tail pipe 17, the temeprature of the gas in the tail pipe is increased accompanied by an increase in the static pressure of the gases in the tail pipe 17. This increase in static discharge gas pressure reduces the pressure drop across the turbine 16, tending to decrease its speed. The speed governor portion of the regulator 10 raises the main fuel flow through the nozzles 5 to return the speed to the correct value. The increased fuel to air ratio in the combustion chambers 4 results in an increase in the temperature of the gas discharged from the turbine 16, which temperature may be destructive of the turbine blades.

In order to reduce the excessive temperature of the gas discharged from the turbine 16 as a result of the burning of reheat fuel in the tail pipe 17, the arrangement now to be described is provided. The tail pipe 17 is provided with a suitable variable area jet nozzle 26 which is actuated by a suitable nozzle actuator mechanism such as a series drive motor 27 having a series clutch-brake coil 28 and two series fields 29 and 30 for either direction of rotation. However, it will be readily understood that the variable area jet nozzle 26 may be actuated by a hydraulic actuator or other servomechanism. One or more low time constant temperature sensing units, such as thermocouples 31, are positioned in the tail pipe 17 intermediate the turbine 16 and tail pipe burning nozzles 18. The thermocouples 31 measure substantially the average temperature of the gas discharged from the turbine prior to the introduction of the reheat fuel. The signal from the thermocouples 31 is received by a temperature control amplifier, generally identified as 32, which energizes the nozzle actuator motor 27 responsive to the discharge temperature of the turbine 16 so that the variable jet nozzle 26 is opened responsive to an increase in the discharge temperature, or closed responsive to a decrease.

In the event that the temperature sensing elements are thermocouples, it may be found desirable to compare the temperature signal from the thermocouples with a reference temperature signal, to amplify the error signal, and to use the amplified error signal to energize the nozzle actuator motor 27. In such a system, the thermocouples 31 are arranged in series with a resistor 33 having a constant voltage impressed across it from a voltage source 34. Thus, the direct current signal from the thermocouples 31 is compared with the voltage from the reference voltage source 34 which corresponds to the desired turbine discharge temperature, and the result of this comparison, a plus or a minus or a zero error signal, is converted to direct current pulses by converter 35. Converter 35 may be a simple vibrator unit operated from a source of alternating current 36 so that a plus direct current error signal is changed to a series of plus or positive pulses of the same frequency as the frequency of the alternating current source 36, while a minus error signal will be changed to a corresponding series of minus or negative pulses. The positive or negative pulses are impressed on the control electrode of a voltage amplifying device 37 and the amplified error signal is impressed on the control electrode of a voltage amplifying device 38 through a coupling comprising resistors 39 and 42, and capacitor 40. The anodes of voltage amplifiers 37 and 38 are supplied with operating potential which for example may comprise a 300 volt direct current voltage source, through terminal 41. This potential is supplied to the anode of voltage amplifier 37 through a resistor 42.

Voltage amplifier 38 is inductively coupled through an inter-stage transformer 43 to a stage which may be designated as a discriminator, consisting of diodes 44, 45, 46, and 47, and including resistors 48, 49, 50, and 51 and a center tapped power supply transformer 52. The output of this stage is obtained from the center tap 53 of supply transformer 52 and the center tap 54 of the inter-stage coupling 54 and supplied to the control electrodes 55 and 56 of electron discharge devices 57 and 58 comprising the next amplification stage.

When there is no temperature error signal, electrodes 55 and 56 are at approximately zero potential with respect to the cathodes of devices 57 and 58 which are therefore continuously conducting. When there is a temperature error signal, which is amplified and supplied through the discriminator, one or the other of electrodes 55 or 56 becomes negative and the corresponding device 57 or 58 becomes non-conductive.

The direct current pulses produced by converter 35 by a temperature error signal received from thermocouple 31 constitute a square wave alternating current voltage. When the turbine temperature is too high, the resulting temperature error signal results in a series of positive direct current voltage pulses which can be said to constitute a square wave alternating current voltage with a positive direct current displacement of approximately one-half the height of the pulse peak. When the temperature is too low and the resulting error signal is negative, the negative pulses which result give rise to a similar square wave alternating current output voltage with a negative direct current voltage displacement approximately equal to one-half of the square wave peak. However, since devices 37 and 38 are continuously conductive, and since their output is supplied to the discriminator stage through a coupling transformer 43, the direct current voltage displacement of these square wave alternating currents is immaterial. The only significant difference between the two signals, as they are seen by the discriminator stage, is that the original error signal pulses, be they positive or negative, occurred in the same phase so that the resulting alternating current square wave output voltages are respectively displaced 180° for original plus or minus signals.

The discriminator stage may be described as an electronic switch and its operation is as follows. Alternating current power is derived from source 36 for the power input transformer 52. This is the same power source as that used for the converter 35. In a half-cycle of alternating current voltage on the secondary of transformer 52, when the upper terminal 59 of this transformer becomes positive, diodes 44 and 46 become conductive so that the current flow is from the secondary winding of transformer 52 to point 59, through resistor 48, diode 44 to point 60, through diode 46 and resistor 50 to point 61, and thus back to the secondary winding of transformer 52. Since the sum of resistance 48 and the plate resistance of diode 44 is approximately equal to the sum of resistance 50 and the plate resistance of diode 46, and since the two halves of the secondary winding of transformer 52 deliver equal voltages, the voltage appearing across the upper half of the secondary winding of transformer 52 is equal to the voltage drop across resistor 48 and diode 44 and the voltage appearing across the lower half of the secondary winding of transformer 52 is equal to the voltage drop across resistor 50 and diode 46. Therefore, center tap 53 of transformer 52 and point 60 are at the same potential during this period of conduction by diodes 44 and 46 and, for purposes of voltage measurement, these two points appear to be connected together. On the next half-cycle of alternating current voltage in the secondary winding of transformer 52, when the lower portion of this secondary winding becomes positive, diodes 47 and 45 become conductive and the identity of potentials and apparent connection are established in a similar manner between points 53 and 62. Since point 62 is connected to the lower terminal of inter-stage coupling transformer 43, it will be seen that the discriminator circuit establishes a voltage measuring connection between point 53, and alternatively point 60 or 62 on alternate half-cycles of the alternating supply voltage. Since the center tap 54 of inter-stage transformer 43 is connected to control electrode 55 of device 57 and the center tap 53 of transformer 52 is connected to electrode 56 of device 58, it will, therefore, be apparent that the voltages on the respective halves of the inter-stage coupling transformer 43 are impressed on the electrodes 55 and 56 respectively on alternate half-cycles, and the respective polarities of these connections also change on alternate half cycles. Since the alternating voltage applied to the discriminator is the same alternating voltage with the same frequency as that applied to the converter 35, the discriminator will recognize the phase of the square wave generated at the converter 35, and depending upon the polarity of the original temperature error signal and the resulting phase of the square wave alternating voltage, either electrode 55 or electrode 56 is biased negatively causing the associated, normally-conducting device 57 or 58 to become non-conductive.

The stage including devices 57 and 58 is used here as an amplifier stage. However, this stage could also be used as a discriminator since power is also derived from alternating current source 36 through power supply transformers 64 and 65. The anode circuits of devices 57 and 58 comprise respectively the secondary windings of transformers 64 and 65 and load resistors 66 and 67. When current is flowing through these devices and load circuits, the common connections 68 and 69 between the respective supply transformer secondary windings and the load resistors are negative with respect to the common connection 70 between the two load resistors 66 and 67. Since point 70 is connected through a resistor 71 to the cathodes of devices 72, 73, 74, and 75 in the next amplification stage, and connections 68 and 69 are connected to the respective sets of control electrodes of devices 72, 73, and 74, 75, as long as devices 57 and 58 are conducting and, as a result, points 68 and 69 have respective negative potentials, and the devices 72, 73, 74, and 75 all remain non-conductive. However, if either device 57 or device 58 becomes non-conductive in response to a temperature error signal, as described above, then the associated grids of devices 72 and 73 or 74 and 75 lose their negative bias and these devices become conductive. This occurs because of the fact that a positive potential is applied to connection 70 and the cathodes of devices 57 and 58 from the amplifier power source 41 through a resistor 76. This causes either point 68 or 69 to become less negative, as the case may be, when the associated load resistor is not conducting, resulting in a less negative potential for the connected control electrodes of devices 72 and 73 or 74 and 75. Point 70 is positive with respect to the cathodes of devices 72—75 because of the positive voltage applied from terminal 41 through resistor 76 to point 70 and the resulting voltage drop across the inter-stage cathode resistor 71. The amplifier stage comprising devices 72—75 is supplied with alternating current power from source 36 through power supply transformers 77 and 78. Between the center taps of the secondary windings of power supply transformers 77 and 78 and the cathodes of devices 72—75, relay coils 79 and 80 are respectively connected. Therefore, through the amplifier just described, relay coil 79 is energized responsive to a plus error signal, and relay coil 80 is energized responsive to a minus error signal. Contacts 81, actuated by the relay coil 79, and normally-closed contacts 82 of maximum open limit switch 83 of the variable area jet nozzle 26 are arranged in series with field winding 29 of nozzle actuator motor 27 and a source of actuator motor power 84.

It will now be seen that an increase in reheat fuel flow called for by the reheat throttle 23 results in an immediate tendency for the temperature of the gas discharge from the turbine 16 to increase. Any slight increase in turbine discharge temperature above the reference level established by the constant voltage source 34 is sensed by the thermocouples 31 and results in a plus error signal which energizes relay coil 79 closing contacts 81. Assuming that the variable area jet nozzle 26 has not reached its maximum open position and that, therefore, limit switch contacts 82 are still closed, the field winding 29 of the nozzle actuator motor 27 is energized. This causes the nozzle actuator motor 27 to start to open the variable area jet nozzle 26. When the variable area jet nozzle 26 has opened a sufficient amount to return the turbine discharge temperature to the desired value, a zero error signal is impressed on the converter 35 causing the relay coil 79 to be deenergized, opening the contacts 81 to stop the nozzle actuator motor 27. When the clutch-brake coil 28 is deenergized, a brake mechanism (not shown) quickly stops the nozzle actuator motor 27.

Relay coil 80, which is energized responsive to a minus temperature error signal, actuates contacts 85. The contacts 85, normally-closed contacts 86 of a circuit to be hereinafter described, and normally-closed contacts 87 of maximum closed limit switch 88 of the variable area jet nozzle 26 are arranged in series with field winding 30 of the nozzle actuator motor 27 and the source of actuator motor power 84. Thus, a minus error signal responsive to a tendency for the turbine discharge gas to decrease temperature produced by a decrease in reheat fuel flow will energize relay coil 80 closing contacts 85. Assuming that the maximum closed position of the variable area jet nozzle 26 has not been reached so that the contacts 87 of the limit switch 88 are still closed and that the contacts 86 are closed, the field winding 30 is energized so that the nozzle actuator motor 27 starts to close the variable area jet nozzle 26. In this case also, when the temperature of the turbine discharge gas equals the reference temperature, a zero error signal will result which deenergizes relay coil 80, opening contacts 85 and stopping the nozzle actuator motor 27.

It will be readily apparent that the action of the temperature control amplifier unit 32 to energize the nozzle actuator motor 27 for opening or closing the variable area jet nozzle 26 occurs substantially simultaneously with the tendency for the temperature of the turbine discharge gas to increase or decrease. Thus, a tendency for the turbine discharge gas temperature to increase or decrease is substantially simultaneously accompanied by a corresponding increase or decrease in the area of the variable area jet nozzle 26 so that the temperature increase or decrease is wiped out to maintain the turbine discharge temperature at substantially a constant level.

The general arrangement of components of temperature control amplifier 32 is shown in Fig. 2. As described above, the thermocouples 31 are arranged in series with the reference voltage from source 33 and the converter 35. The output of the converter 35 is supplied to the voltage amplifier designated here as 89 and comprising devices 37 and 38 and associated components, and its output is supplied to the phase discriminator 90 which includes the discriminator tubes 44—47 and the associated apparatus. The output of the discriminator unit 90 is amplified by a power amplifier 91 including devices 57, 58, and 72—75 and the associated circuit components in Fig. 1 which, in turn, energizes the contactors 79 and 80. The power requirements of the temperature control amplifier 32 are supplied by sources 36 and 41. As mentioned previously, it is desirable to provide a stabilizing network 92 between the contactors 79 and 80, and the phase discriminator 90 to match the action of the temperature control amplifier unit 32 to the time constants of the gas turbine 1.

As shown in Fig. 1, the contactors 79 and 80 include auxiliary contacts 93 and 94 which are arranged so that when either relay 79 or 80 is energized, these contacts connect amplifier power to a relay 95 to initiate operation of the stabilizing network 92. This network consists of a grid-controlled electron discharge device 96 with a cathode resistor 97 and a resistor-capacitor grid control network comprising resistors 98, 99, 100, 101, 102, and 103, and capacitors 104 and 105. Relay 95 includes normally-open contact 106 and normally-closed contacts 107 and 108. Resistors 98, 99, and 100 perform the function of a power supply potentiometer for the grid network. The cathode of device 96 is connected through resistors 109 and 110 to the control electrodes 55 and 56 of amplifiers 57 and 58 which also constitute the output connections of the discriminator stage.

The operation of the stabilization network is as follows. When a temperature error signal is amplified and actuates either relay 79 or relay 80 to change the jet nozzle area, auxiliary relay contacts 93 or 94 are closed, thus energizing stabilizing network relay 95, closing contact 106, and opening contacts 107 and 108 in the stabilizing network. Contact 106 thereby connects voltage from potentiometer resistor 99 to resistor 101 and thus to resistor 102 and to the control grid of device 96.

However, capacitor 104 must be charged through resistor 101 before the voltage at the point common between resistors 101, 102, and capacitor 104 can approach the voltage at resistor 99. Capacitor 105 is also charged through resistor 102. Therefore, a certain time after closure of contact 106, the voltage of the common connection between resistor 102 and capacitor 105 and the grid of valve 96 will rise. This time is determined by the resistance values of resistors 101 and 102 and the capacitances of capacitors 104 and 105 and the resulting time constants of this combination. After capacitors 104 and 105 are charged and the control electrode of device 96 comes up to voltage, the device 96, which was previously non-conductive, becomes conductive. When this occurs, the resulting current causes a voltage drop across resistor 97 which raises the potential of the common connection between this resistor and resistors 109 and 110, thus raising the potential of the grids 55 and 56 of valves 57 and 58 and assuring that these valves will remain conductive. Since the transmission of a temperature error signal through the temperature control amplifier depends, as described above, upon cutting off conduction in either of devices 57 or 58, as long as the control electrodes of these devices are both maintained positive, the entire control system is desensitized by conduction in the stabilizing network valve 96. The nozzle actuator relay 79 or 80, which has previously picked up will therefore drop out, and stabilization network actuating relay 95 will in turn drop out, disconnecting relay contact 106 and reconnecting contacts 107 and 108. Capacitors 104 and 105, which have been charged by the voltage from resistor 99, must then discharge through resistor 103 before the voltage of the grid of device 96 may descend so as to cause device 96 to again become non-conductive and remove the stabilization control voltage from resistors 109 and 110 and grids 55 and 56. This occurs after a predetermined time delay depending upon the time constant of the resistor capacitor network comprising capacitors 104 and 105 and resistors 102 and 103. Temperature control through the temperature control amplifier will then be established.

It will be seen that since a very definite time is required for the control electrode of device 96 to come up to its full voltage, device 96 becomes conductive gradually. The drop across resistor 97, therefore, gradually raises the voltage of electrodes 55 and 56 of amplifiers 57 and 58, thus gradually opposing, with the passage of time, the error signal which has been supplied to the system from the thermocouples. Thus, it will be seen that the larger the temperature error signal is, the longer the electrode 55 or 56 remains negative and the longer the temperature error signal remains operative before being cut off by the stabilization circuit. Therefore, this temperature control system quite properly makes a larger correction before stabilization cut-off when a large temperature error exists than when a smaller error exists. This temperature control, therefore, may operate in a series of correction steps without overshooting and without being desensitized for a period longer than is necessary to prevent overshooting and oscillation or hunting. It will be seen that by adjusting the stabilization control time constants an ideal stabilization control cycle may be established for any such control system. It will, of course, be understood that this stabilization control means may be used profitably with other control systems and other control signal amplifiers.

With a system as thus far described, the "dry" or unaugmented engine may be operated on temperature control at maximum thrust. When the engine is first started, the turbine temperature will be lower than the reference temperature, causing the variable area jet nozzle 26 to go fully closed to the limit switch 88. The variable area jet nozzle 26 then remains in the fully closed position until the turbine discharge temperature exceeds the reference temperature at which time the resultant plus error signal causes the nozzle actuator motor 27 to open the variable area jet nozzle 26 a sufficient amount to maintain the temperature at the reference level. This action may take place prior to the beginning of augmented operation. The first few degrees of advance of the reheat throttle 23 opens a valve to a pilot burner (not shown) and switches on the pilot burner ignition (also not shown) for the reheat nozzles 18. As the reheat throttle advance is continued, the reheat stop cock 25 is opened and the reheat fuel regulator 21 begins to increase the fuel flow to the reheat fuel nozzles 18. The resultant tendency for the turbine discharge temperature to increase is sensed by the thermocouples 31 causing the nozzle actuator motor 27 to drive the variable area jet nozzle 26 open still further to maintain the turbine discharge temperature at the reference level.

It may be found desirable to arrange the reheat fuel regulator 21 so that more reheat fuel is delivered at the full reheat throttle position than can be burned in the reheat nozzles 18, under all conditions, with the maximum area of the jet nozzle 26 without exceeding the reference temperature. In this situation, a plus error signal remains in the temperature control amplifier unit 32 after the maximum area of the jet nozzle 26 has been reached. It is, therefore, desirable to transfer this plus error signal to the reheat fuel regulator 21 so that the reheat fuel flow can be reduced responsive to the plus error signal remaining after the maximum area of the variable area jet nozzle 26 has been reached. To accomplish this result, the reheat throttle 23 is linked, for instance, through gears 111 to input gear 112 of the differential 24. The output gear 113 of the differential 24 is linked, as by gears 114 to the control shaft of the reheat fuel regulator 21. The cage 115 of the differential 24 is linked, as by gears 116, shaft 117, and gears 118 to series reheat regulator motor 119 which is provided with series field exciting windings 120 and 121 and a clutch-brake coil 122. Thus, when the reheat regulator motor 119 is not operated to drive the cage 115 of the differential 24, movement of the reheat throttle 23 is transmitted through the differential 24 to directly operate the control shaft of the reheat fuel regulator 21.

When the variable area jet nozzle 26 reaches its maximum open position, it operates limit switch 83 opening the normally-closed contacts 82 and closing normally-opened contacts 123. The reheat regulator actuator motor 119 is arranged to produce a maximum limit of rotation of the cage 115, for instance, by means of a cam 124 on the drive shaft 117 which actuates limit switches 125 and 126. Assuming that the cam 124 is in the position to actuate limit switch 125, normally-closed contacts 127 of limit switch 126 remain closed. Thus, if the advance of the reheat throttle is continued past the point when the maximum open position of the variable area jet nozzle 26 has been reached, and if there is still a tendency for the turbine discharge gas temperature to increase, the remaining plus error signal will keep contacts 81 of relay coil 79 closed (assuming, of course, that there may be interruptions by the stabilization control) so that field winding 121 of the reheat regulator actuator motor 119 will be energized from the source of actuator motor power 84 through contacts 81, 123, and 127. Thus, the reheat regulator actuator motor 119 will be operated to drive the cage 115 of the differential 24 in the proper direction to override or wipe-out the advance of the reheat throttle 23 so that the reheat fuel regulator 21 is operated to produce the proper reheat fuel flow to maintain the turbine discharge temperature at the reference level.

Any movement of the reheat regulator actuator motor 119 to override the advancing motion of the reheat throttle 23 responsive to a plus error signal on the relay coil 79 causes the cam 124 of the shaft 117 to move away from the limit switch 125 opening contacts 86 in the circuit of the field winding 30 of nozzle actuator motor 27 and closing contacts 128 in the circuit of field exciting winding 120 of reheat regulator actuator motor 119. Continued advance of the reheat throttle 23 is accompanied by continued operation of the reheat regulator actuator motor 119 driving the cage 115 of the differential 24 to override the increased reheat fuel flow called for by the reheat throttle 23 to maintain the turbine discharge temperature constant. The limit switch 126 is actuated by the cam 124 to open contacts 127 to stop the reheat regulator actuator motor 119 at a predetermined minimum fuel flow.

It will now be readily apparent that a minus error signal which would normally cause energization of the field exciting winding 30 of nozzle actuator 27 to decrease the area of the variable area jet nozzle 26 is transferred to the field exciting winding 120 of the reheat regulator actuator motor 119. Thus, if the reheat throttle 23 is retarded, producing a tendency for the turbine discharge temperature to decrease, the resultant minus error signal energizes relay coil 80 closing contacts 85, and the field exciting winding 120 of the reheat regulator motor 119 is energized by the actuator motor power 84 through the contacts 85 and 128. The reheat regulator actuator motor 119 then operates to drive cage 115 of differential 24 in the opposite direction to override the retarding action called for by reheat throttle 23 to maintain the reheat fuel flow at the proper value to keep the turbine discharge temperature at the reference level. When the reheat regulator actuator motor 119 has completed its limit of travel, cam 124 actuates the limit switch 125 opening the contacts 128 and closing the contacts 86, thus transferring the control to the nozzle actuator motor 27. Continued retardation of the reheat throttle 23 producing a minus error signal is then accompanied by operation of the nozzle actuator motor 27 to decrease the area of the variable area jet nozzle 26 to maintain the turbine discharge temperature at the reference level.

Referring now to Fig. 3 in which like elements are indicated by like reference numerals, there is shown schematically the circuit arrangement wherein the temperature error signal from the temperature control amplifier 32 is used only to vary the area of the variable area jet nozzle 26 and is not transferred to the reheat fuel regulator 21 when the maximum area of the variable area jet nozzle 26 has been reached. In this case, when the variable area jet nozzle 26 is driven to its maximum open position by the nozzle actuator motor 27, the maximum open limit switch 83 is operated opening contacts 82 and stopping the motor. Thereafter, a minus error signal responsive to a tendency for the turbine discharge temperature to decrease causes relay coil 80 to close contacts 85, energizing field exciting winding 28 through the maximum closed limit switch contacts 87. This arrangement may be utilized in a gas turbine power plant where the maximum reheat fuel flow delivered at full reheat throttle position with the maximum area of the jet nozzle 26 will not produce a temperature exceeding the reference temperature.

It will now be readily apparent that the control system described herein provides the optimum jet nozzle area for maximum thrust during "dry" engine operation and, in addition, insures that the turbine discharge temperature does not vary substantially from a predetermined constant value during reheat fuel burning. Furthermore, if the reheat nozzles do not light or are in some way extinguished, the jet nozzle area will automatically assume a value which will never give less than the maximum "dry" engine thrust. Furthermore, it will be apparent that with this control system incorporating the stabilization network described above, the operation of the system is extremely stable and reliable, while at the same time operating a fast-acting temperature control.

While we have illustrated and described a particular embodiment of this invention, modifications thereof will occur to those skilled in the art. We desire it to be understood, therefore, that this invention is not to be limited to the particular arrangement disclosed, and we intend in the appended claims to cover all modifications which do not depart from the spirit and scope of the invention.

What we claim as new and desire to secure by Letters Patent of the United States is:

1. A system for controlling a gas turbine power plant in accordance with a desired temperature of operation by varying the exhaust area of the power plant and comprising means for detecting the variation from the desired temperature, an apparatus to generate a temperature error signal in response to said detected temperature variation and a control amplifier for amplifying said signal, relays adapted to be energized from said amplified signal, a reversible control motor, one of said relays being adapted when energized to operate said motor in one direction, and another of said relays being adapted when energized to operate said motor in the other direction, a stabilization circuit associated with said signal amplifying means and adapted to be energized upon operation of either of said relays, said stabilization circuit comprising at least one resistor and at least one capacitor adapted to be charged through said resistor when said stabilization circuit is energized, the voltage resulting from the charge on said capacitor being connected to render said control amplifier inoperative for the transmission of a temperature error signal after a period of time which is proportional to the magnitude of said error signal, said control amplifier, when so deenergized, being adapted to drop out said control relays, thus interrupting the movement of said reversible motor and deenergizing said stabilization circuit, said stabilization circuit then being connected to discharge said capacitor to render said control amplifier reoperative.

2. In a system for the control of a tempertaure within a gas turbine by varying the turbine exhaust nozzle area, voltage generating thermocouples for detecting the temperature to be controlled, a source of reference voltage corresponding to the thermocouple voltage at the desired temperature, a converter for comparing the thermocouple voltage with the reference voltage and converting the difference voltage constituting a temperature error signal into an alternating current voltage at a desired frequency, the alternating current voltage generated as a result of a temperature error in one direction being displaced in phase from the alternating current voltage generated as a result of a temperature error in the opposite direction, a first amplifier for amplifying said alternating current voltage, means for discriminating between the alternating current voltage resulting from a temperature error in one direction and the alternating current voltage resulting from a temperature error in the opposite direction by comparing the phase relationships of the respective resulting alternating current voltages emanating from said converter, a second amplifier for separately and alternatively amplifying a discriminated error signal resulting respectively from a temperature error in either direction, a relay for each direction of temperature error to be actuated when appropriate by said second amplifier to energize a control motor, a temperature control system stabilization circuit including an actuating relay which is connected to be energized when either of said first-mentioned relays is energized, said stabilization circuit including a plurality of capacitors and resistors and at least one electron discharge device, said capacitors being connected to be charged when said stabilization circuit is energized and adapted, by means of the voltage acquired by said charge, to render said device conductive in proportion to the amount of said charge and the resulting magnitude of said voltage, the amount of said charge and the conduction of said device being proportional to the period of energization of said stabilization circuit, means for measuring the current through said device in terms of a voltage, and a connection from said current measuring means to said second amplifier for comparing the voltage from said current-measuring means with the temperature error signal voltage input to said second amplifier and for rendering said second amplifier inoperative to transmit an error signal when the voltage from said current-measuring means becomes large enough to overcome said signal voltage.

References Cited in the file of this patent

UNITED STATES PATENTS

| | | |
|---|---|---|
| 2,113,164 | Williams, Jr. | Apr. 5, 1938 |
| 2,300,742 | Harrison et al. | Nov. 3, 1942 |
| 2,457,595 | Orr. Jr. | Dec. 28, 1948 |